United States Patent [19]

Lester

[11] 3,739,329

[45] June 12, 1973

[54] ELECTRONIC SYSTEM FOR LOCATING

[75] Inventor: Robert W. Lester, Manhasset, N.Y.

[73] Assignee: Recognition Devices, Inc., Manhasset, N.Y.

[22] Filed: May 24, 1971

[21] Appl. No.: 146,040

[52] U.S. Cl. ................ 340/16 R, 340/3 E, 340/312
[51] Int. Cl. ................ G01s 3/80
[58] Field of Search ................ 340/15, 16 R, 213.1, 340/213.2, 226, 312, 408, 3 E; 343/6.5 R, 6.5 LC, 6.5 SS

[56] References Cited

UNITED STATES PATENTS

| | | | |
|---|---|---|---|
| 2,870,435 | 1/1959 | Graaf | 340/312 |
| 3,439,320 | 4/1969 | Ward | 340/16 R |
| 3,182,315 | 5/1965 | Sweeney | 343/6.5 SS |
| 3,478,344 | 11/1969 | Schwitzgebel et al. | 340/312 |

*Primary Examiner*—Richard A. Farley
*Attorney*—Thomas B. Graham

[57] ABSTRACT

An electronic locating system includes a central console having a transmitter, receiver, and a display means, and a plurality of portable transreceiver units, and a plurality of stations located at various places such as rooms on the premises where the system is installed. The transmitter is adapted to transmit signals of particular UHF frequencies, each signal being identified with a person to be sought. The portable unit is tuned to receive the UHF signal of a particular frequency code and generate an ultrasonic sound wave. A station adjacent to the portable unit (but within the same room) is adapted to receive the ultrasonic sound wave and generate an UHF signal frequency identified with the station. The receiver is adapted to receive the UHF signal transmitted by the station and the display means adapted to indicate the location of the station transmitting the UHF signal, thereby identifying the room location of the person being sought. The system includes means for utilizing existing power supply wires. The system is also adapted to operate with the existing telephone switching networks for enabling a person to be connected with another person within the premises by automatically ringing the telephone located near the other person in the same room. This system completely eliminates all types or forms of paging which require the cooperation of the person being sought and which do not give him the same dignity. With the present locating system, circumvention is not possible if continuous scanning is used. Also a most important aspect is the fact that a person may not be able to answer (as in a restroom) which would be indicated to the caller who is always the only one involved.

13 Claims, 5 Drawing Figures

INVENTOR.
ROBERT W. LESTER

BY [signature]

ATTORNEY

Patented June 12, 1973 3,739,329

3 Sheets-Sheet 2

INVENTOR.
ROBERT W. LESTER

BY [signature]

ATTORNEY

INVENTOR.
ROBERT W. LESTER

BY [signature]

ATTORNEY

ELECTRONIC SYSTEM FOR LOCATING

BACKGROUND OF THE INVENTION

1. Field of the Invention

The present invention relates to an electronic locating system and, more particularly, novel and improved means in such a system which simplify the overall structure and make the system versatile and reliable.

2. Description of the Prior Art

Presently available paging systems generally include a rather elaborate network of speakers, distributed throughout the premises being serviced by them. They are usually not designed to operate speakers selectively but to operate all of them simultaneously to page a person, and thus pose annoyances to others. There are other elaborate systems, such as desk intercom-networks utilizing rather complex private branch telephone exchange facilities. These systems are characterized by the fact that they are not capable of detecting the location of the person sought or connecting the caller automatically by telephone to the person desired without his cooperation.

BRIEF DESCRIPTION OF THE INVENTION

It is therefore an object of the present invention to provide an improved and simplified electronic system, which indicates the location of the person wanted.

It is another object of the present invention to provide a system which indicates where a person is without disturbing him, or without his cooperation or consciousness.

These and other objects of the invention are achieved by providing a central console having means for transmitting and receiving UHF signals, a plurality of portable transreceiver units being carried by people in the premises and a plurality of stations installed in various locations of the premises where the system is installed. The system is so designed that, when a person is sought to be located a particular key or push button associated with the person is pressed, and this actuates the transmitter to generate an UHF signal of a particular frequency identified with the person. The portable unit he is carrying is tuned to respond to this frequency signal and generate an ultrasonic sound wave. One of the stations nearby detects the ultrasonic sound wave and generates another UHF signal of a particular frequency identified with the station. The receiver in the central console receives this UHF signal and actuates an indicating means in the display unit identified with the station transmitting the UHF signal and, in this manner, provides the information on the location of the person.

Using the portable units generating an ultrasonic sound wave, and adapting the transmitter and receiver to generate and receive radio frequency waves, separate transmission cables or wires that would otherwise be required between the central console and various remote stations of the premises are eliminated.

Ultrasonic sound waves do not readily penetrate physical barriers, such as, walls separating adjoining rooms. This characteristic is advantageously used in the system in that a station will pick up the ultrasonic sound wave from a room or proximity, but will not pick up the sound wave transmitted by a portable unit in the adjoining room or some distance thereby preventing an overlap.

It is another feature of the present invention that it is adapted to utilize, as transmission paths from the remote stations of the central console, the existing wires and networks that are supplying ordinary 60 Hz, 115 volts house currents.

It is still another feature of the present invention to provide means in the central console and the stations for cyclically scanning the positions of the persons carrying the portable units and identifying their locations on a plotting board.

It is a further feature of the present invention to adapt the system to function with an existing telephone switching network and provide means to automatically reach another person located within the system and automatically identify the position of a telephone near the other person and send a ringing signal to that telephone.

Aforesaid and other objects and features of the present invention will be more clearly understood from the following detailed description of the present invention and accompanying drawings.

DETAILED DESCRIPTION OF THE PREFERRED EMBODIMENTS

Figure 1:
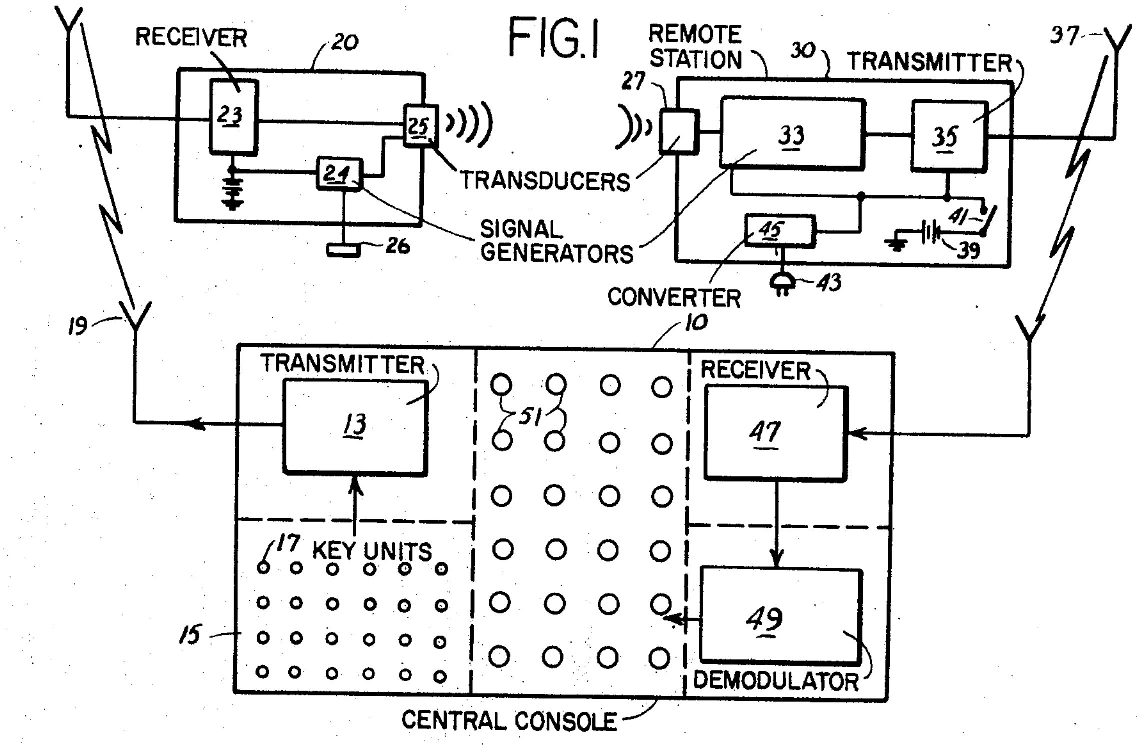
FIG. 1 is a block diagram of the electronic locating system of the invention.

The present system generally includes a central console 10 including means for transmitting a plurality of UHF signals of different frequencies in a first band of frequencies, each identified with a particular person being sought. Each individual within the premises being serviced by the system is provided with a portable trans-receiver unit 20 tuned to receive the UHF signal of a particular frequency with which he is identified. In response to the UHF signal, the portable unit is adapted to generate an ultrasonic sound wave. The system includes a plurality of stations 30 which are located at various positions within the premises. The station near the portable unit receives the ultrasonic sound wave and generates a UHF signal of a particular frequency identified therewith, said frequency being in a second band of frequencies far removed from the first band of frequencies. The central console 10 includes means for receiving this UHF signal from said station and thereby identify the position of the person.

Referring again to FIG. 1, more specifically, the central console 10 includes a transmitter 13 which is designed to send out AC signals at high frequency ranges, such as VHF or UHF bands. The console further includes a plurality of push buttons or key units 15, the operation of which generate AC signals of particular frequencies identified with persons being sought. Thus, for example, a person may be identified with key 17, and the actuation of the key 17 enables the transmitter 13 to send an AC signal of a particular frequency, for example, 200 KHz identified with him and broadcast it to the premises via an antenna 19.

The portable unit includes a receiver 23 tuned to the AC signal, namely, the 200 KHz, and in return actuates its transducer 25 which generates an ultrasonic frequency sound wave of a given frequency, for example, 25 KHz. The transducer 25 may be a conventional device such as a piezo electric element which is capable of generating the ultrasonic sound wave when actuated electrically by the output of the receiver 23. The portable unit is also provided with a suitable electrical signal generating means 24 actuable by a push button 26 for applying a current to the piezo electric element 25 to generate the ultrasonic sound wave. This push button arrangement makes it possible for a person carrying the unit to initiate an alarm signal. The central console is provided with a suitable means (not shown) of a conventional arrangement such as blinking red lights or audible sounds which if adapted to respond to the alarm signal and identifies the originating location of the alarm signal. Using solid state integrated circuitries, the portable unit 20 is made small enough so that it can be carried in a pocket of a person or mounted on a pen, and be powered by a battery.

The ultrasonic sound wave is then detected by a transducer 27 of the remote station 30 located nearby. The detected sound wave is then converted into an electrical signal which is in turn used to actuate a signal generator 33 to generate a signal of a particular frequency, for example, 600 KHz, identified with the station. This signal is then transmitted by the transmitter 35 through its antenna 37. The stations may be operated by a battery 39 via a switch 41, or on the ordinary house current 110 volts, 60 Hz supplied through a plug 43 and an AC-to-DC converter 45. Using integrated circuits, the stations can be made small enough so that they can be plugged into the electrical outlets found at the various locations in the premises.

The 600 KHz signal is then received by a receiver 47 provided in the central console 10, and converted into a suitable type of signal by a demodulator 49 and applied to a particular one 30' of the display indicating means 51 identifying the station 30. This indicates to the operator of the central console that the person is near station 30.

Figure 2:
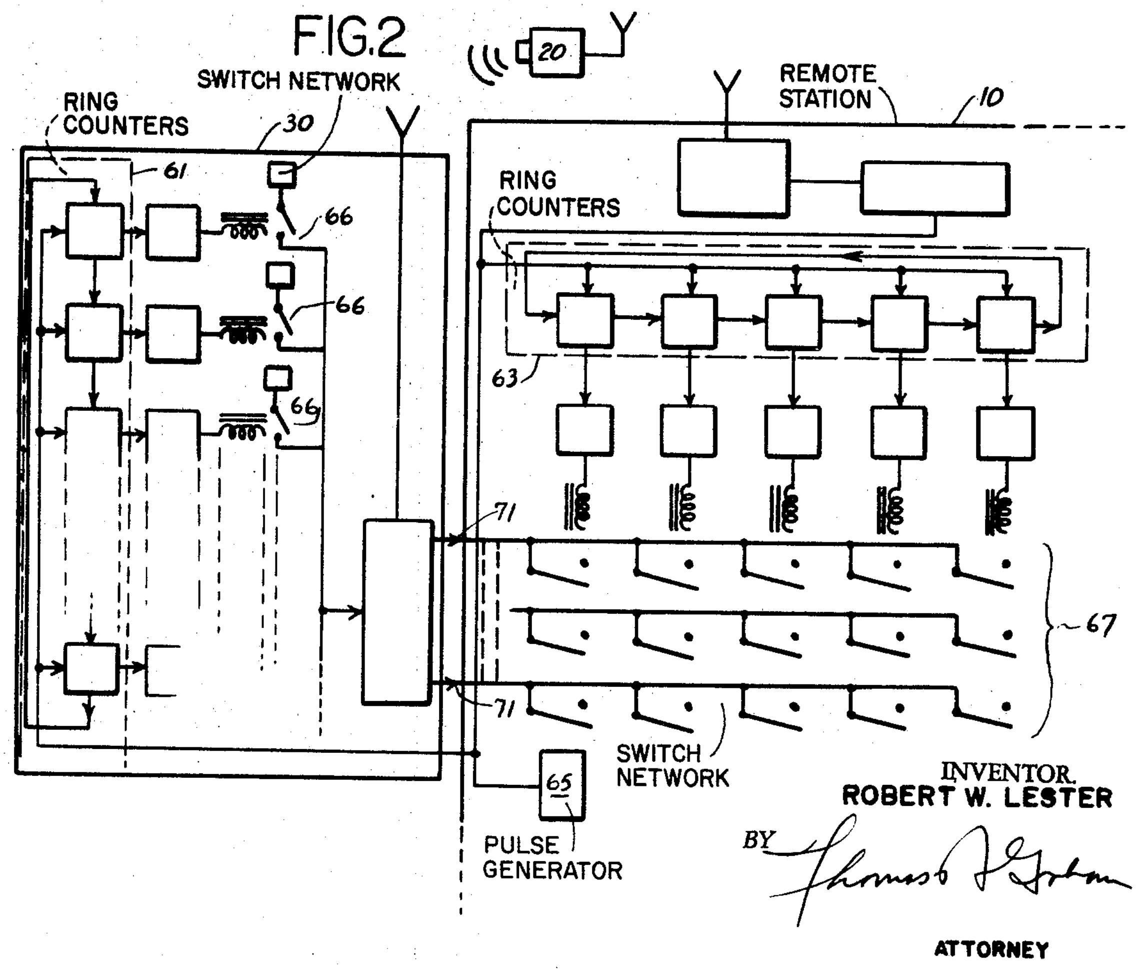
FIG. 2 is a detailed block diagram of the system shown in FIG. 1 including means for enabling the system to cyclically scan the location of a number of people carrying the portable units.

As distinguished from the system of FIG. 1 which is arranged to locate one or more people on the premises rapidly, FIG. 2 shows the system that can locate them sequentially in cycles by scanning. This is done by providing ring counters 61 and 63 in the remote station 30 and the central console 10, and a pulse generator 65 for synchronously actuating the counters. The central console and the remote station may utilize conventional reed switch networks 66 and 67 which are actuated by the ring counters in a conventional manner.

In operation, the transmitter 13 of the central console transmits automatically a plurality of AC signals in sequence under the control of the pulse generator 65. The individual portable units found at various positions on the premises detect and generate the ultrasonic sound waves in the sequence in which the AC signals are generated. These sound waves are in turn detected by the plurality of remote stations 30 adjacent the portable units and the outputs thereof are radioed back to the receiver of the central console as shown in FIG. 1 or may be transmitted through a plurality of conductors 71, and actuate the reed switches 67. The display means may include suitable means such as nixie lamps each being successively lit in the sequence in which the reed switches 67 are operated. In this manner the system can be used to show sequentially the positions by various persons being located in cycles.

Figures 3, 4:
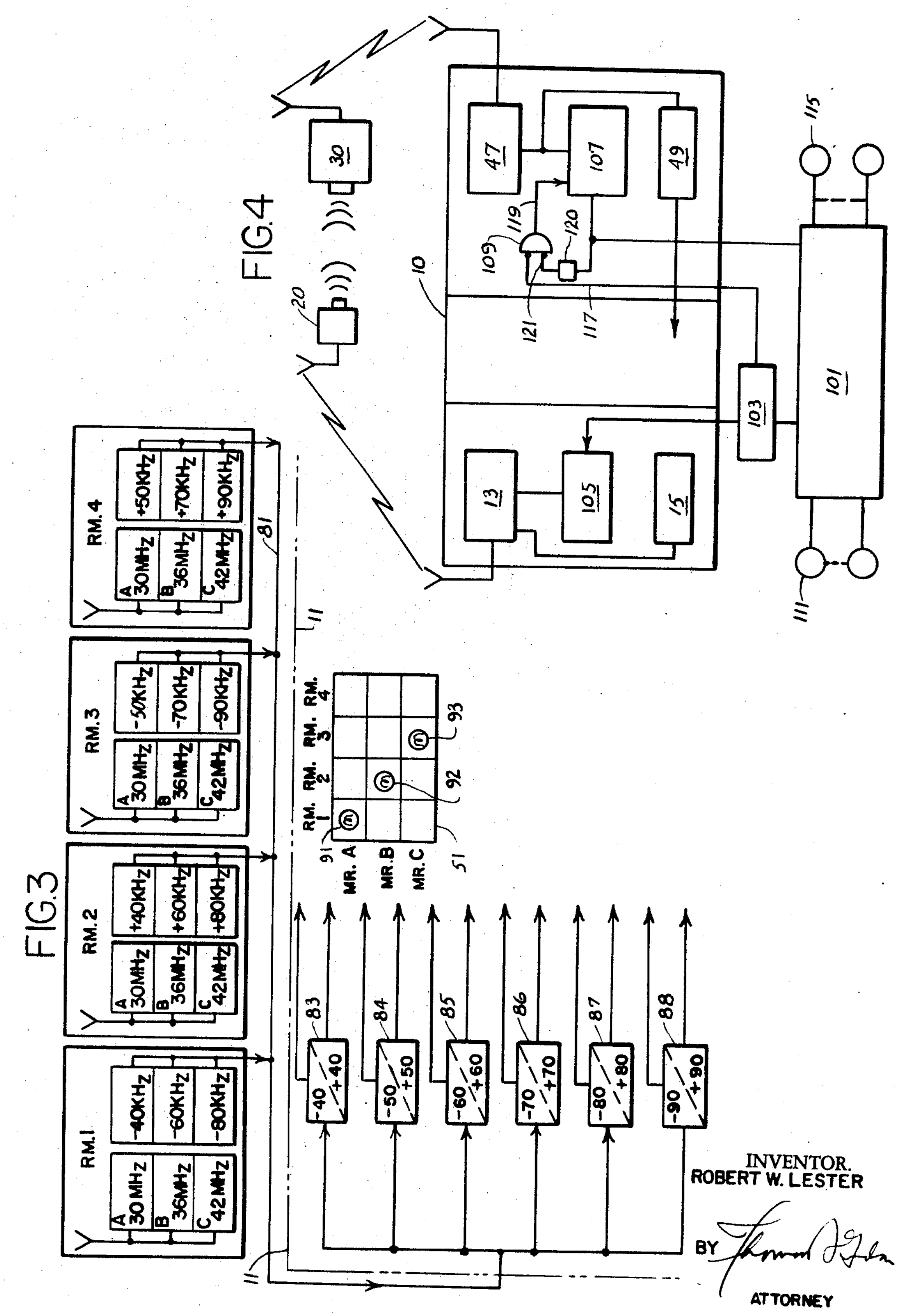
FIG. 3 is a block diagram showing the use of existing household 60 Hz, 115 volts power supply wires used as the transmission paths between the stations and the central console.
FIG. 4 is a block diagram of the present system including encoding and decoding means which are connected to a private branch switching facility for enabling a person to identify automatically the location of another person on the premises being serviced by the system and automatically ring a telephone located near the other person and thereby communicate with him.

FIG. 3 shows a modification of the present system to utilize an existing network of the wire pairs supplying the ordinary 115 volts, 60 Hz house currents on the premises being serviced by the system. Thus, for example, various rooms or locations on the premises may be provided with a station adapted to generate AC signals of different frequencies with positive or negative bias to identify the locations and the persons being sought. For example, the plurality of portable units carried by persons such as Messrs. A, B, and C may be tuned to receive 30, 36, and 42 MHz AC signals from the central console and in return generate ultrasonic waves of the same or different frequencies. The station in room No. 1 is adapted to receive the ultrasonic waves and generate −40, −60, −80 KHz AC signals upon detection of the ultrasonic sound waves generated by the units being carried by Messrs. A, B, and C respectively. Rooms No. 2, No. 3, and No. 4 may be adapted to generate AC signals of different frequencies and polarities, as shown.

These AC signals from the various stations are then transmitted to the receiver 47 of the central console 11 through the wires 81 supplying the house current. The receiver 47 may include a plurality of conventional circuits 83, 84, 85, 86, 87 and 88 which are adapted to detect the polarity and tuned to the particular frequencies of the AC signals from the remote stations. The output of the circuits 83 – 88 are then applied to a suitable conventional display unit 51 having indicating means arranged in rows and columns of coordinate array, the rows identifying the persons being sought and the columns identifying room locations. For example, suppose Mr. A, Mr. B and Mr. C are respectively located at rooms 1, 2, and 3, then the display means which may be nixie lamps 91, 92 and 93 in the display board 51 will be lit. The system illustrated in FIG. 3 can easily be modified to provide simultaneous and continuous read out of the locations and identities of the person carrying the portable units on the display board 51.

The present locating system may be so arranged that a calling person can dial an access code and a number identified with the called person and enable him to identify the location of another person he wishes to reach and reach him automatically via an existing telephone system and the present system. This is accomplished by designing the system to respond to the calling signal from a extension phone and send out a AC signal identified with the person being called. In response, the pocket unit carried by that person generates the ultrasonic wave and the remote station near him picks it up and transmits an AC signal to the receiving unit of the console in the manner as described before. The decoding unit of the console is adapted to translate the received signal into a telephone position nearest the remote station sending the signal. In response, the telephone system provides the necessary ringing signal to the telephone and thereby complete the connection. If necessary, the receiver of the system can also be modified to actuate a particular display means identifying the position of the remote station sending the carrier signal and thereby identify the presence of the person being sought by the calling person.

The system for providing the aforedescribed function is schematically illustrated in FIG. 4. As shown the system is modified to work with an existing switching systems 101 such as private branch exchanges to provide the automatic identification and location function. Thus, generally stated the console 10 of the system is linked to the switching network 101 of a conventional design. An access network 103 of a suitable design provided between switching network 101 and the central console 10 to make the two systems compatible and to provide the necessary functions as will be explained in more detail hereinbelow. The central console 10 is provided with an encoding network 105 interposed between the access network 103 and the transmitter 13, a decoding network 107 interposed between receiver 47 and the switching network 101, and an actuating gate 109 interposed between the access network 103 and the decoder 107. The access network 103, the encoding network 105, the decoding network 107 and the actuating gate 109, may be any conventional circuitries which are adapted to provide the necessary functions indicated below. Thus, suppose a Mr. A on the premises wishes to reach a Mr. B located on the premises somewhere. Not knowing where Mr. B is, Mr. A will go to a telephone extension 111, and dial on access code which may be one or more digits assigned to provide a path from the extension phones to the central console 10, and digits assigned to Mr. B. The access network in response channels the call to the encoding network 105 via the access network 103. The encoding network 105 may be of a conventional design to receive the digital or binary or pulse codes from the telephone extension and translates them into a signal for enabling the transmitter 13 to generate the AC signal identified with the party being paged. The portable unit 20 carried by Mr. B automatically responds to the AC signal and emits the ultrasonic sound wave and the station 30 near him responds to the ultrasonic sound wave. The station 29 will, in turn, send out another signal identifying the station as described previously. The receiver 47 of the system responds to the AC signal and the signal is applied to the decoding network 107.

The decoding network 107 is adapted to translate the received AC signal into a signal recognizable by the switching network 101 as being directed to a telephone extension 115 positioned near Mr. B and apply the output thereof to the switching network 101. The switching network 101, in turn, sends a ringing signal to the extension 115 in a wellknown manner and thereby enable extension 115 to generate the familiar ringing signal to summon Mr. B. When Mr. B answers the call by lifting the receiver of the extension 115 the call is accomplished automatically.

The actuating gate 109 is provided in the manner shown in the order that the decoding network 107 is put into operation only when a locating signal is initiated from an extension of the switching network in the manner described above and disable it when the telephone switching network is not involved in the locating service. The actuating gate 109 operates in this manner. As soon as the access network 103 receives the signal from the switching network 101, it generates an output signal and applies it to the actuating gate 109 through a conductor 117. The output of the actuating gate 109 is applied through a conductor 119 to the decoder network 107 to energize it and thereby prepare the latter to receive the signal from the receiving unit 47. The output of the decoder network 107 is also applied to a suitable network 120 which is responsive to the completion of the transmission of the signal from the decoder 107 and at the same apply to the inhibit electrode 121 of the actuating gate 109 to turn it off. In turn, the actuating gate 109 turns off and disables the decoding network 107 so that the decoding network is made available for a subsequent use.

Figure 5:
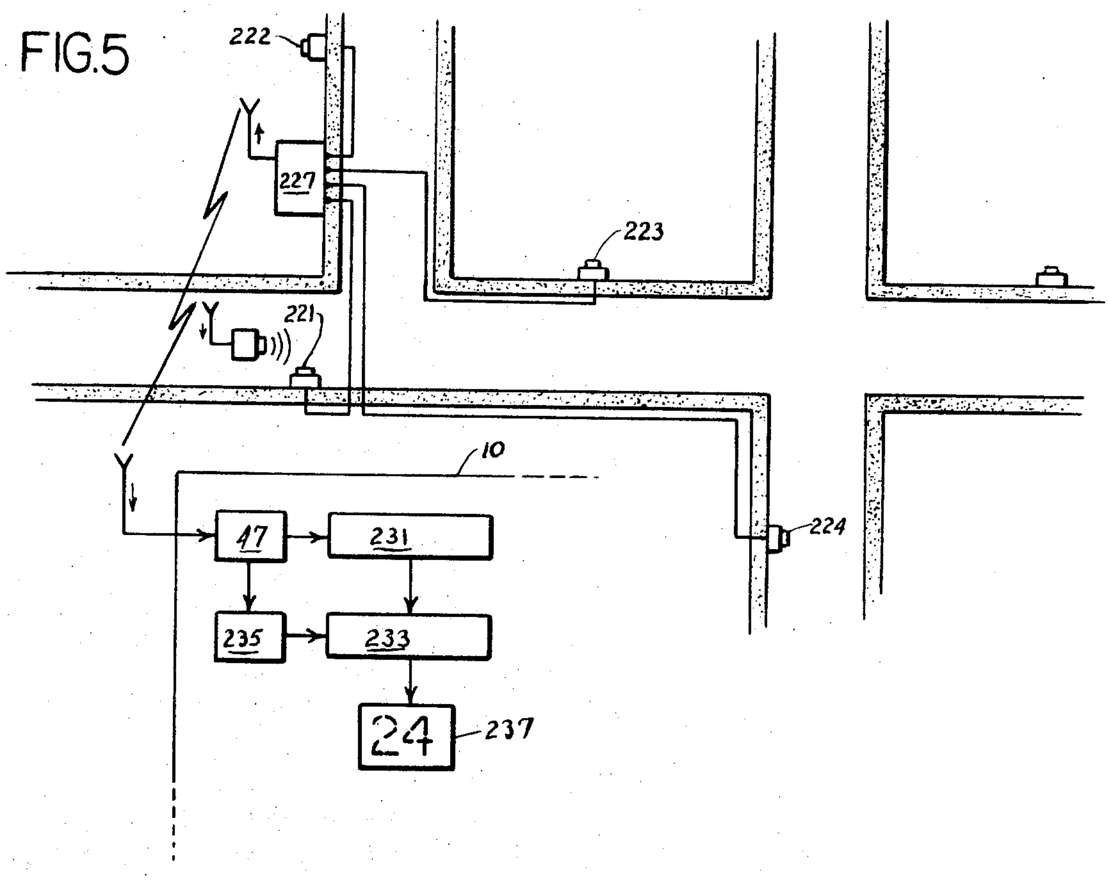
FIG. 5 shows a schematic drawing of a common station servicing a plurality of transducers situated in adjacent rooms or hallways, and means in the central console for locking onto the first received AC signal from the transducers and locking out the remainder of the AC signals from the remote station arriving later, thereby enabling the system to identify the location of the transducer nearest to the person.

FIG. 5 illustrates another modification of the system described above in connection with FIG. 1 whereby the central console is able to identify the position of the transducer 221 nearest the portable unit 20 from a number of transducers 221, 222, 223, and 224. As shown in the figure, a station 227 may be provided to serve a plurality of locations to save the hardware involved and thus reduce the cost of the system. This is made possible by connecting the plurality of transducers 221, 222, 223 and 224 positioned at different locations and connected to the common station 227. Being physically near the unit, the transducers 121 – 124 may all detect the signal from adjacent rooms to the unit. Absent some suitable means, the system will be confusing in that its display signal will indicate that a person is present in all of the locations serviced by the transducers 221, 222, 223 and 224.

The central console 11 is provided with means to avoid this. To do this the means are adapted to lock on the signal arriving first and lock out other signals arriving later. More specifically the console includes a signal processor 231 interposed between the receiver 47 a lockon-and-lockout unit 233. The central console is further provided with a detecting circuit 235 responsive to the first signal from the remote station 161 arriving at the receiver 47 for actuating the lockon-and-lockout-unit 233. The processor 231 translates the AC signals into a suitable code for actuating the indicating means 237. In the meantime, the detector 235 from the receiver 47 enables the lockon-and-lockout-unit 233 to receive the first AC signal being processed by the processor 231 and apply this signal to the indicating means 237. The unit 233 is also adapted to lock out other AC signals from the transducers 122, 123 and 124 which reaches the receiver 47 later. In this manner the present system as modified in FIG. 5 provides a necessary discrimination for the central console in identifying the position of the person being sought which may be detected by several transducers.

Various other modifications may be made from the principles of the present invention as described and illustrated hereinabove. For example, the central console may be provided with video screens to operate with an existing closed circuit television system. The central console may also include a suitable print out system for periodically recording the position of persons being monitored or directly into a computor bank readout arrangement.

What is claimed is:

1. An electronic locating system installable on a premise comprising:

means for transmitting a plurality of AC signals of different frequencies in a first band of frequencies, each signal frequency being identified with a person;

a plurality of portable units carriable by persons, each unit having means tuned to receive the AC signal of a particular frequency identified with a person and means to generate an ultrasonic sound wave in response to said received AC signal;

a plurality of stations positionable at various locations on said premises, each station having means responsive to the ultrasonic sound wave generated by a portable unit near thereto and means for generating an AC signal of a predetermined frequency in a second band of frequencies identified with said stations; and means for receiving the signal of predetermined frequency from the stations; and means responsive to said received signal for indicating the position of the station transmitting said receiving AC signal, and thereby identify the location of the persons.

2. The system according to claim 1, wherein each portable unit further includes a manually actuable switch means for actuating said means generating a said ultrasonic sound wave.

3. The system according to claim 1, wherein said receiving means of each portable unit includes a circuit tuned to a particular frequency actuable in response to the detection of the AC signal of a particular frequency; and said ultrasonic sound wave generating means include a pizezo electric element responsive to the signal from said tuned circuit.

4. The system in accordance with claim 1, wherein each station includes a transducer responsive to said ultrasonic sound wave for generating an output signal and means responsive to said output signal for generating the AC signal of a particular frequency in said second band.

5. A system in accordance with claim 4, wherein said station includes battery for energizing said AC signal generating means and said transmitter.

6. The system in accordance with claim 1, including a central console wherein said transmitting and receiving means are mounted;

a plurality of actuable keys, each identified with a person, said transmitting means including a plurality of AC signal generated means respectively responsive to the actuation of said plurality of actuable keys for enabling selective generation of said AC signals; and a plurality of display means disposed in said console respectively identified with said plurality of stations.

7. The system in accordance with claim 6, including means for demodulating the AC signal received by the said receiving means into a digital signal; said display means including digital read-out circuits responsive to the demodulated signal for indicating the position of the station transmitting said AC signal.

8. The system according to claim 1, wherein each of said plurality of portable units is adapted to generate an ultrasonic sound wave of a distinct frequency different from those generated by the other portable units;

each of said station including a plurality of circuits tuned to receive the ultrasonic sound waves of different frequencies; and ordinary house current transmission paths connecting the output of said stations to the receiving means.

9. The system in accordance with claim 8, including means for superimposing DC bias of different polarities to said plurality of AC signals generated by said plurality of stations, and receiving means adapted to discriminate said polarities.

10. The system in accordance with claim 9, including means for actuating said plurality of portable units and stations in a successive cycles and said receiving means and display means being adapted to operate in synchronization with the operation of said portable units and stations for automatically providing visual indications of the locations of the persons carrying said plurality of the portable units in successive cycles.

11. The system in accordance with claim 1, including a switching network for providing connecting paths to a plurality of telephones, said network including means responsive to a predetermined access code from a telephone for channeling the calling signal toward said transmitting means;

access means for providing a connection path from said switching circuit to said transmitting means;

an encoding network connected to said access network for receiving a coded signal identified with a person being sought and translating said encoded signal into an actuating signal enabling said transmitting means to send out an AC signal identified with said paged person; and a decoding network interposed between the receiving means and said switching network, said decoding network including means for translating an AC signal received from a remote station transmitting said AC signal and generating a calling signal of a telephone located near said station and transmitting said calling signal to said switching network for ringing said telephone.

12. The system in accordance with claim 11, including an actuating gate responsive to the operation of said access means for conditioning said decoding network to receive the signal from the remote station and means for turning off said actuating gate upon completion of the transmission of said calling signal.

13. The system in accordance with claim 1, wherein selected ones of said stations include a plurality of transducers positioned at a plurality of adjoining locations for detecting the presence of the ultrasonic sound wave;

a plurality of receiving means connected to said plurality of transducers for generating a plurality of AC signals; there being a time delay between said AC signals arising from the difference in the distance from said portable units to said transducers;

said receiving means including means for detecting the AC signal arriving at said receiving means first; means for locking onto said first detected AC signal and locking out other AC signals arriving at said receiving means subsequent to said first detected AC signal; and, means responsive to the first detected AC signal for actuating said display means, whereby the display means indicates the position of the transducer nearest the portable unit.

* * * * *